*Reissued Jany. 2d 1872.*

118,100

UNITED STATES PATENT OFFICE.

THOMAS BROOKS, OF MINERVA, OHIO, ASSIGNOR TO HIMSELF, THOMAS JACKSON, AND FRANK A. FOSTER, OF SAME PLACE.

IMPROVEMENT IN PROCESSES OF CONVERTING IRON INTO STEEL.

Specification forming part of Letters Patent No. 118,100, dated August 15, 1871.

*To all whom it may concern:*

Be it known that I, THOMAS BROOKS, of Minerva, in the county of Stark and State of Ohio, have invented a new and useful Process for Converting Iron into Steel, of which the following is a specification:

My invention relates to converting iron into different grades of steel; and the said invention consists, first, in producing a tool-welding steel from Swedish-roll bar-iron by the use, in particular proportions, of tungsten, charcoal, manganese, and fluor-spar or chlorophane; second, in producing a finer quality of tool-welding steel by the employment in the process of calcium, tungstate, charcoal, manganese, and fluor-spar or chlorophane; and third, in producing fine steel from Bessemer scrap or rail-bar, the employment of bismuth in connection with cast-iron or fluor-spar or chlorophane, manganese, and charcoal.

In the production of steel several of the ingredients above mentioned have heretofore been used, but with unsatisfactory results, the steel produced being dry and brittle. But by my process and the employment of particular proportions of these ingredients I have discovered that a tough and malleable quality of steel is produced that will weld perfectly and solidly without welding-fluxes or powders. In the production of the second grade, or a finer quality of steel, I claim to produce a new result by the use of calcium-tungstate in place of tungsten in connection with the ingredients used to produce the first grade. In the first and second grades I use Swedish roll-bar of the K. B. brand. In the third and last grade of steel I use Bessemer scrap or rail-bar, and claim to produce file-steel by the use of bismuth in connection with cast-iron or fluor-spar or chlorophane, manganese, and charcoal.

The proportions of the several ingredients which I employ to produce the several grades of steel from iron are as follows, viz.:

To produce tool-welding steel from, say seventy-four pounds of Swedish roll-bar of the K. B. brand, I use fourteen ounces of tungsten; eight ounces of charcoal; three-quarters of an ounce of manganese; eight ounces of fluor-spar or chlorophane.

To produce a still finer quality of tool-welding steel from the same quantity and quality of iron, I use two and one-half ounces of calcium-tungstate; eight ounces of charcoal; three-quarters of an ounce of manganese; eight ounces of fluor-spar or chlorophane.

To produce file-steel from the same quantity of Bessemer scrap or rail, I use one and one-half pound of cast-iron or two pounds of fluor-spar or chlorophane; one-half of an ounce of manganese; one and one-half ounce of charcoal; one ounce of bismuth.

The steel produced from these ingredients and by the processes described will weld without the usual chemicals for that purpose, will make tools with clean sharp edges, and be perfectly malleable and tough. I propose to treat any kind of iron and change it into a very fine quality of steel; but I prefer to use the K. B. brand, as I have found that that quality makes the best steel.

In the process of making steel, fine Swedish bar has been first converted into blister-steel, and then broken into a smelting-pot, and then poured into cast-steel; but by my process I use the K. B. brand of Swedish bar unconverted, put into a smelting-furnace with the ingredients stated, and produce tool-steel.

Having described my invention, I claim—

1. In the process of converting iron into steel, the combination, in the proportions stated, of the ingredients employed to produce a tool-welding steel, as described.

2. In the process of converting iron into steel, calcium-tungstate, in combination with the ingredients stated, to produce a fine quality of steel, as described.

3. In the process of converting iron into steel, bismuth, in combination with the ingredients used to produce a fine quality of file-steel, as described.

4. In the process of converting iron into steel, fluor-spar or chlorophane, in combination with the ingredients used to produce file-steel, as described.

THOMAS BROOKS.

Witnesses:
H. A. FOSTER,
HENRY VANMETER.